United States Patent
Zhang et al.

(10) Patent No.: US 11,926,340 B2
(45) Date of Patent: Mar. 12, 2024

(54) DISTRIBUTED CENTRALIZED AUTOMATIC DRIVING METHOD

(71) Applicant: AutoCore Technology (Nanjing) Co., Ltd., Jiangsu (CN)

(72) Inventors: Yang Zhang, Nanjing (CN); Cheng Chen, Nanjing (CN); Jie Liu, Nanjing (CN)

(73) Assignee: AutoCore Technology (Nanjing) Co., Ltd., Jiangsu (CN)

( * ) Notice: Subject to any disclaimer, the term of this patent is extended or adjusted under 35 U.S.C. 154(b) by 67 days.

(21) Appl. No.: 17/607,040

(22) PCT Filed: Apr. 24, 2020

(86) PCT No.: PCT/CN2020/086845
§ 371 (c)(1),
(2) Date: Oct. 28, 2021

(87) PCT Pub. No.: WO2020/207504
PCT Pub. Date: Oct. 15, 2020

(65) Prior Publication Data
US 2022/0204025 A1   Jun. 30, 2022

(30) Foreign Application Priority Data
Apr. 30, 2019 (CN) .......................... 201910360926.4

(51) Int. Cl.
*B60W 60/00* (2020.01)
*B60W 50/00* (2006.01)
(Continued)

(52) U.S. Cl.
CPC .......... *B60W 60/001* (2020.02); *B60W 50/00* (2013.01); *G01C 21/1652* (2020.08);
(Continued)

(58) Field of Classification Search
CPC ............... B60W 60/001; B60W 50/00; B60W 2556/50; B60W 2556/40; B60W 2556/55;
(Continued)

(56) References Cited

U.S. PATENT DOCUMENTS

2015/0187216 A1* 7/2015 Kwak .................... G08G 1/164
2015/0331442 A1* 11/2015 Hartung ................ G05D 1/021
(Continued)

FOREIGN PATENT DOCUMENTS

CN        107161141 A  *  9/2017  ............ B60W 30/00

OTHER PUBLICATIONS

K. Jo, "Development of Autonomous Car—Part II: A Case Study on the Implementation of an Autonomous Driving System Based on Distributed Architecture", 2015 (Year: 2015).*

*Primary Examiner* — Elaine Gort
*Assistant Examiner* — Brittany Renee Peko
(74) *Attorney, Agent, or Firm* — JCIPRNET

(57) ABSTRACT

A distributed centralized automatic driving method comprises a sensor processing module, a perception positioning module, a perception target detection module, a decision-making module, a planning module, and a vehicle control module. By clearly defining data domains and a control process, a modular design is performed to implement each functional method, and each module can be deployed to a control unit of the corresponding data domain according to the load of a computing platform. The distributed centralized automatic driving method has different computing requirements for different scenarios. By means of a distributed design, centralized computing is distributed to different computing unit modules, so as to greatly improve the stability, efficiency and parallelism of the method, thereby improving the overall performance of the method.

5 Claims, 5 Drawing Sheets

(51) Int. Cl.
  *G01C 21/16* (2006.01)
  *G01C 21/34* (2006.01)
  *G07C 5/00* (2006.01)
(52) U.S. Cl.
  CPC ......... *G01C 21/3415* (2013.01); *G07C 5/008* (2013.01); *B60W 2420/52* (2013.01); *B60W 2420/54* (2013.01); *B60W 2520/10* (2013.01); *B60W 2556/40* (2020.02); *B60W 2556/50* (2020.02); *B60W 2556/55* (2020.02); *B60W 2556/60* (2020.02)
(58) Field of Classification Search
  CPC ......... B60W 2556/60; B60W 2420/52; B60W 2420/54; G01C 21/1652; G01C 21/3415; G07C 5/008
  See application file for complete search history.

(56) References Cited

U.S. PATENT DOCUMENTS

| | | | |
|---|---|---|---|
| 2016/0028824 A1* | 1/2016 | Stenneth | H04L 67/12 |
| 2016/0167653 A1* | 6/2016 | Malone | B60W 30/18 |
| 2019/0066409 A1* | 2/2019 | Moreira da Mota | G07C 5/0808 |
| 2019/0129789 A1* | 5/2019 | Koay | G06F 11/0793 |
| 2019/0220011 A1* | 7/2019 | Della Penna | G05D 1/0088 |
| 2020/0142406 A1* | 5/2020 | Srini | G05D 1/0088 |

* cited by examiner

DISTRIBUTED CENTRALIZED AUTOMATIC DRIVING METHOD

TECHNICAL FIELD

The invention relates to the technical field of automatic driving, in particular to a distributed centralized automatic driving method.

DESCRIPTION OF RELATED ART

Autonomous vehicles are able to sense the ambient environment so as to realize automatic driving in the environment without human intervention. An automatic driving method has a complicated algorithm implementation including perception, positioning, decision-making, planning and control, and is realized generally based on interaction with various sensors, controllers and computing methods. To handle these complicated computing methods, process the interaction between sub-methods, guarantee the performance and reduce data transfer costs, a centralized computing method is often adopted. The centralized processing method intends to simplify the interaction of mass data; however, during actual implementation, the centralized processing method may make the method difficult to maintain and expand and cannot guarantee the robustness of the method under the precondition of controllable costs, which is particularly reflected in the limitation of selecting a core chip platform.

Although the centralized computing method can guarantee the performance and reduce data transfer costs, the automatic driving method involving a mass of different types of sensors and input data puts forward extremely high requirements to a chip platform, may generate dominating risk points and performance bottlenecks in the implementation process, and can hardly realize capacity expansion.

A distributed centralized automatic driving method is broken up into a series of configurable and reorganizable modules, which can be deployed according to actual chip and hardware capacity, based on logic operations by constructing modular software and hardware computing units. By means of a reasonable design, the interdependency between software and hardware modules is minimized, flexible expandability is realized by means of a distributed method, and software and hardware redundancies of the method are fulfilled to guarantee the robustness of the method. The dependency of traditional automatic driving platforms on centralized computing is overcome, the performance bottlenecks and stability risk points of the method are removed, and the redundancy design and convenient capacity expansion of the method are fulfilled by means of distributed computing. The implementation and deployment of software and hardware of the method may be customized according to different automatic driving scenarios.

BRIEF SUMMARY OF THE INVENTION

Based on the rich practical experience and professional knowledge accumulated in the research and development process and further study and innovation, the inventors put forward a design method and implementation approach of a distributed centralized automatic driving method by reasonable definitions of data domains and a control process and good information interaction.

The invention provides a distributed centralized automatic driving method. According to the distributed centralized automatic driving method, data domains and a control process are clearly defined, a modular design is performed to implement each functional method, and each module can be deployed to a control unit of the corresponding data domain according to the load of a computing platform.

The distributed centralized automatic driving method of the invention comprises a sensor processing module, a perception positioning module, a perception target detection module, a decision-making module, a planning module, and a vehicle control module, wherein:

The sensor processing module comprises a laser radar processing module, a visual processing module, an ultrasonic radar, an inertia unit, a GPS navigation module, and a speedometer, wherein the laser radar processing module is used for outputting point clouds;

The perception positioning module is used for inputting the point clouds, GPS longitudes and latitudes, an IMU (acceleration and angular speed), the speedometer and a high-precision map, and outputting a global position of a vehicle;

The perception target detection module is used for scene detection, target detection, road detection and traffic signal detection, and is also used for inputting the point clouds, camera videos and the global position of the vehicle, and outputting a target position, road rules and road guides;

The planning module comprises an available space, lane planning, traffic planning, path planning and path following, and is used for inputting the global position of the vehicle, running decisions, lane rules, the position of a target in a dynamic map, and the road guides, and outputting a path to be followed by the vehicle;

The vehicle control module is used for inputting the path to be followed by the vehicle and a sensor state for current control of the vehicle, and outputting a control command of a vehicle actuator.

Specifically, the whole method comprises a plurality of main scheduling units, and any one main scheduling unit will be replaced with a standby main scheduling unit when breaking down; resource information of all computing units is mastered by the main scheduling units and is backed-up in all standby main scheduling units; and the main scheduling units allocate computing tasks according to resources of the computing units and computing task requirements including data requirements, performance requirements and resource requirements by negotiating with scheduling middleware on each computing unit. The computing units may be physically distributed in the same hardware or chip platform, or in different chips or different hardware methods, and collaborate with each other by means of distributed computing and scheduling. All sensor collaborations for applying the automatic driving method, and the sensor capacity and computing capacity actually configured for the method are configured adaptively in case of co-existence of multiple computing platforms.

Specifically, the redundancy of the distributed centralized automatic driving method may be realized by physical redundancies of the computing units or by multiplexing of software method containers of functional modules. Dynamic capacity expansion of the distributed centralized automatic driving method is realized by abstractly defining computing resources and computing tasks and adding corresponding software or hardware modules according to method requirements.

Specifically, during redundancy design, a distributed management method module generates an activation state signal to inform other units whether the present unit breaks down and whether the present unit is able to participate in method computing, and the main scheduling units are able to accurately determine whether each computing unit of the method can be used for allocating the computing tasks by analyzing the activation state signal.

The distributed centralized automatic driving method of the invention is implemented by the following steps:

Step 1: Defining Functional Modules

The functional modules are defined according to bus categories of the method. The functional modules are implemented in the same hardware method or dynamically transferred to different hardware to run. The functional modules of the method are described in a standard XML (extensive markup language) format, and for each functional module interface, a definition description includes a desired performance indicator, a function to be fulfilled, a communication interface and a dependent data source. A static description of the functional modules determines the dependency of the functional modules on other parts of the method, and the functional modules, as scheduled units of a scheduling method, complete specified method functions based on interaction with other sub-methods. A definition of the functional modules includes a software function and a hardware function. Most functions of the functional modules are fulfilled by means of the collaboration of software and hardware.

Step 2: Defining Data Domains

The data domains are used to describe the functional modules in the aspect of data input-output, and highlight the types and channels of data sources supporting specific functional modules, as well as data outputs of the functional modules, which are then provided for other functional modules in the method.

The functional modules exchange data flows within the capacity of the corresponding data domains. A physical carrier of the data domains is expressed as a physical bus interface such as a CAN bus, FlexRay or Ethernet.

Step 3: Defining a Control and Message Flow

The control and message flow is defined in a client/server mode or a message release/subscription mode. The control and message flow in the client/server mode has an explicit sender and receiver, and communication requirements between the modules are met according to a preset state sequence; and it is unnecessary to specify a receiver or a sender for the control and message flow in the message release/subscription mode, and all modules subscribing messages of interest can receive messages or control commands released by a publisher.

Step 4: Calculating Unit Mapping

The functional modules are mapped onto a selected specific method platform with reference to the definition of the data domains by evaluating computing capacity requirements and performance indicators. Each computing unit is a single SoC (method chip), or multiple SoCs located on a same hardware PCB (printed circuit board) or on multiple hardware PCB sets. The mapping is strategy-based or is based on experience of designers, and a mapping decision is made according to currently available overall method resources.

Step 5: Implementing the Functional Modules

The functional modules are implemented according to the static definition of the modules and the definition of the data domains (input-output), and are divided into a hardware dependent layer, a hardware abstraction layer and an independent software layer, wherein the independent software layer is located above the hardware abstraction layer, fulfills software functions independent of a hardware form of specific (mapped) computing units, and completes the conversion from inputs to outputs in the data domains; the hardware dependent layer is used as a software platform to a great extent, and is developed according to different hardware forms; the hardware dependent layer of the functional modules is closely associated with the mapping of the computing units; and the independent software layer and the hardware abstraction layer are independent of the mapping of the computing units to a great extent.

A physical implementation form of the functional modules is expressed as one to multiple tasks, and these tasks independently or collaboratively run in one Container of the independent software layer.

Step 6: Designing the Scheduling Method

The scheduling method completes the allocation of multiple computing tasks in the independent software layer of a current computing unit; and the task allocation and collaboration of the computing units are completed by the scheduling methods distributed in the computing units.

Step 7: Redundancy Design

The multiple computing units in the distributed centralized automatic driving method form a computing cluster, and when any one unit in the cluster fails, the faulted unit will be automatically switched to or replaced with another computing unit which is in a good condition and has a computing capacity without human intervention by means of the redundancy design of the method.

The distributed centralized automatic driving method of the invention has different computing requirements for different scenarios. By means of the distributed design, centralized computing is distributed to different computing unit modules, so as to greatly improve the stability, efficiency and parallelism of the method, thereby improving the overall performance of the method.

The safety and stability are first demands of a vehicle method, and a centralized automatic driving method has risks in safety and stability. Different from the centralized automatic driving method, functional modules of the distributed automatic driving method are defined and distributed in different physical or logic computing units, so that risks caused by failure of a single node are greatly reduced. The module-level redundancy design is easily realized at low costs.

The deployment flexibility of the distributed centralized automatic driving method makes wiring easy to control, and the purpose of lowering noises and interferences is fulfilled by optimizing the physical deployment.

By means of the modular design, sub-methods with boundaries being clearly defined can be independently developed, tested and integrated.

The modular design makes it possible to upgrade the specification and capacity of the method; and by means of the updating and optimization from local to global, the replacement of modules is reflected as the upgrading and customization of the method capacity.

DETAILED DESCRIPTION OF THE INVENTION

According to a distributed centralized automatic driving method in this embodiment, data domains and a control process are clearly defined, a modular design is performed to implement each functional method, and each module can be deployed to a control unit of the corresponding data domain according to the load of a computing platform.

Figure 1:
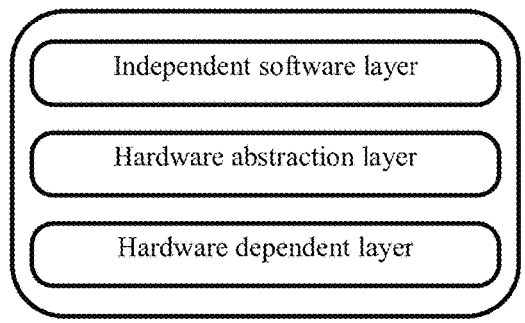
FIG. 1 is a framework diagram for defining and implementing software functional modules according to one embodiment of the invention.
Figure 2:
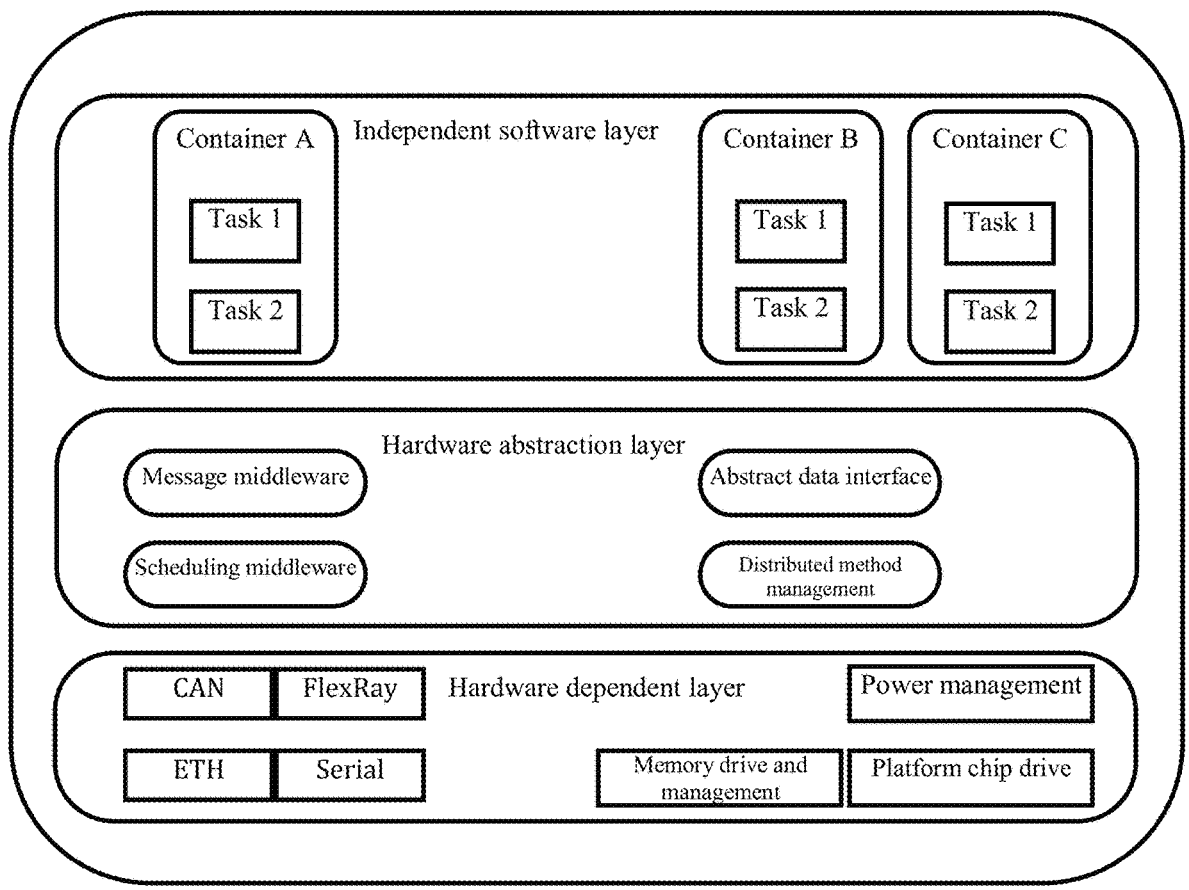
FIG. 2 illustrates an example of the implementation of the functional modules in FIG. 1.

As shown in FIG. 1, software functional modules are defined and divided into an independent software layer, a hardware abstraction layer and a hardware dependent layer to be deployed. As shown in FIG. 2, all the functional modules are implemented in an existing implementation mode.

Figure 3:
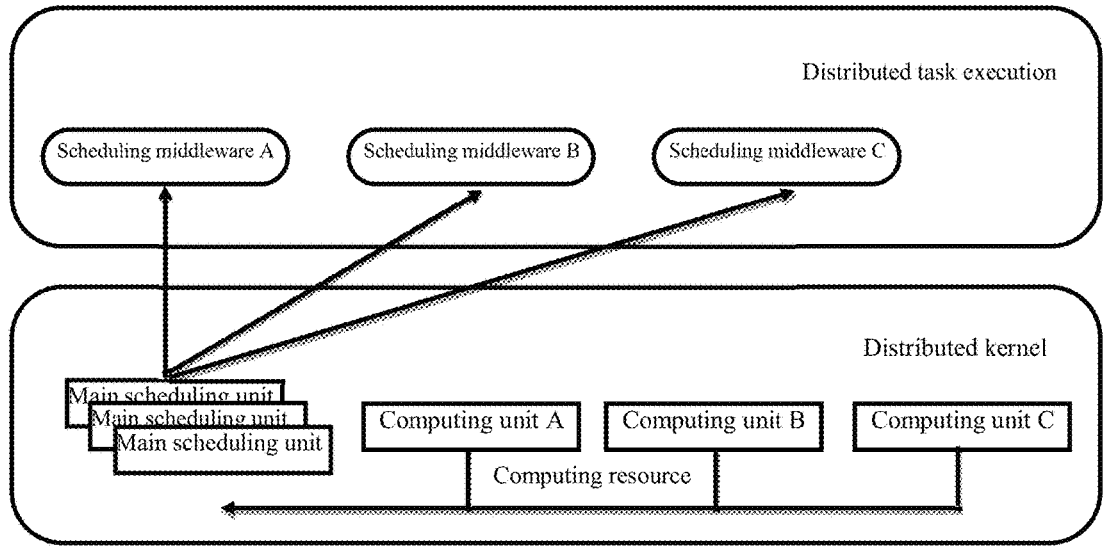
FIG. 3 illustrates an example of the implementation of a scheduling method.

As shown in FIG. 3 which illustrates an example of a scheduling method, one or multiple main scheduling units are configured in the whole method, and any one main scheduling unit will be replaced with a standby main scheduling unit when breaking down. Resource information of all computing units is mastered by the main scheduling units and is backed-up in all standby main scheduling units. The main scheduling units allocate computing tasks according to resources of the computing units and computing task requirements (including data requirements, performance requirements and resource requirements) by negotiating with scheduling middleware on each computing unit.

Figure 4:
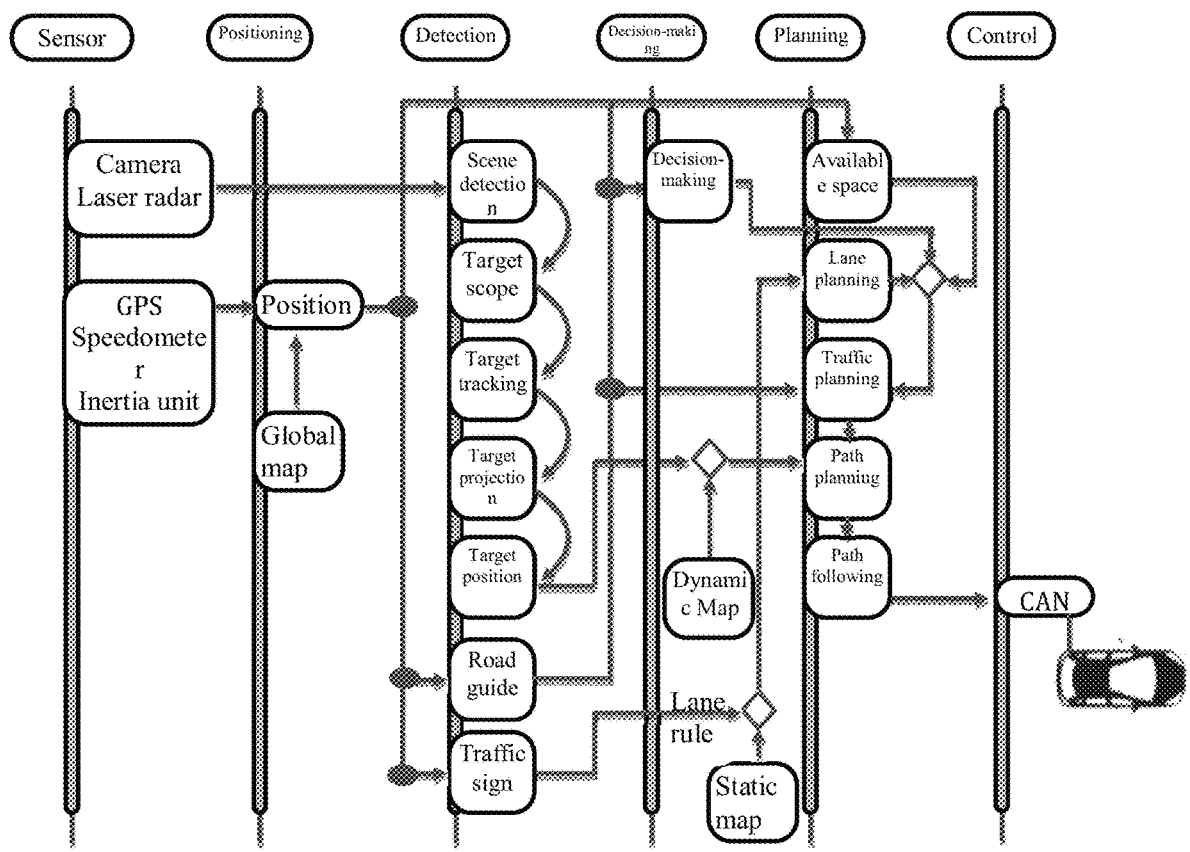
FIG. 4 illustrates an example of a control and message flow of a method.

As shown in FIG. 4, the functional modules are divided into the following six layers:

4.1 A sensor processing module (comprising a laser radar processing module, a visual processing module, an ultrasonic radar, an inertia unit, a GPS navigation module, a speedometer, and the like);

4.2 A perception positioning module;

4.3 A perception target detection module (scene detection, target detection, road detection, traffic sign detection, and the like);

4.4 A decision-making module;

4.5 A planning module (task planning, motion planning);

4.6 A vehicle control module.

Data domains of the functional modules are approximately as follows:

The laser radar processing module is used for outputting point clouds;

The perception positioning module is used for inputting the point clouds, GPS longitudes and latitudes, an IMU (acceleration and angular speed), the speedometer and a high-precision map, and outputting a global position of a vehicle;

The perception target detection module is used for inputting the point clouds, camera videos and the global position of the vehicle, and outputting a target position, road rules and road guides;

The decision-making module is used for inputting the road guides, the global position of the vehicle, a dynamic map and a static map, and outputting running decisions, lane rules, and the position of a target in the dynamic map;

The planning module is used for inputting the global position of the vehicle, the running decisions, the lane rules, the position of the target in the dynamic map, and the road guides, and outputting a path to be followed by the vehicle;

The vehicle control module is used for inputting the path to be followed by the vehicle and a sensor state for current control of the vehicle, and outputting a control command of a vehicle actuator.

The control and message flow of the above modules depends on the description process of the data domains and is shown in FIG. 4.

Figure 5:
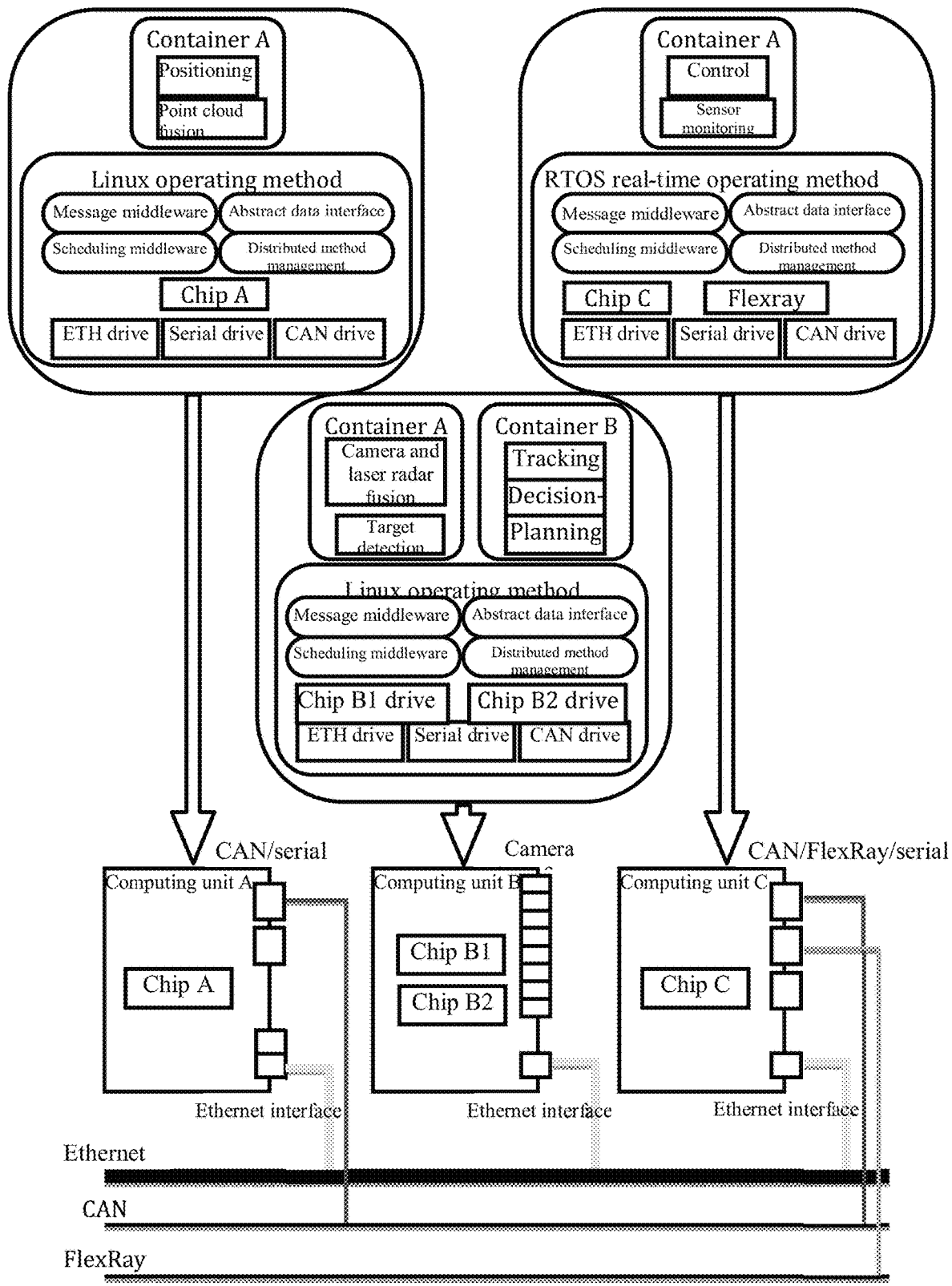
FIG. 5 illustrates an example of mapping of computing units.

FIG. 5 illustrates an example of mapping of the computing units. Mapping from the functional modules to the computing units is based on computing requirements for the functional modules. The functional modules are implemented in different layers, so that the mapping can well support multiple chip platforms of different structures, as shown in FIG. 5 which illustrates the drive of different chips by the hardware independent layer during hardware implementation of the functional modules.

Figure 6:
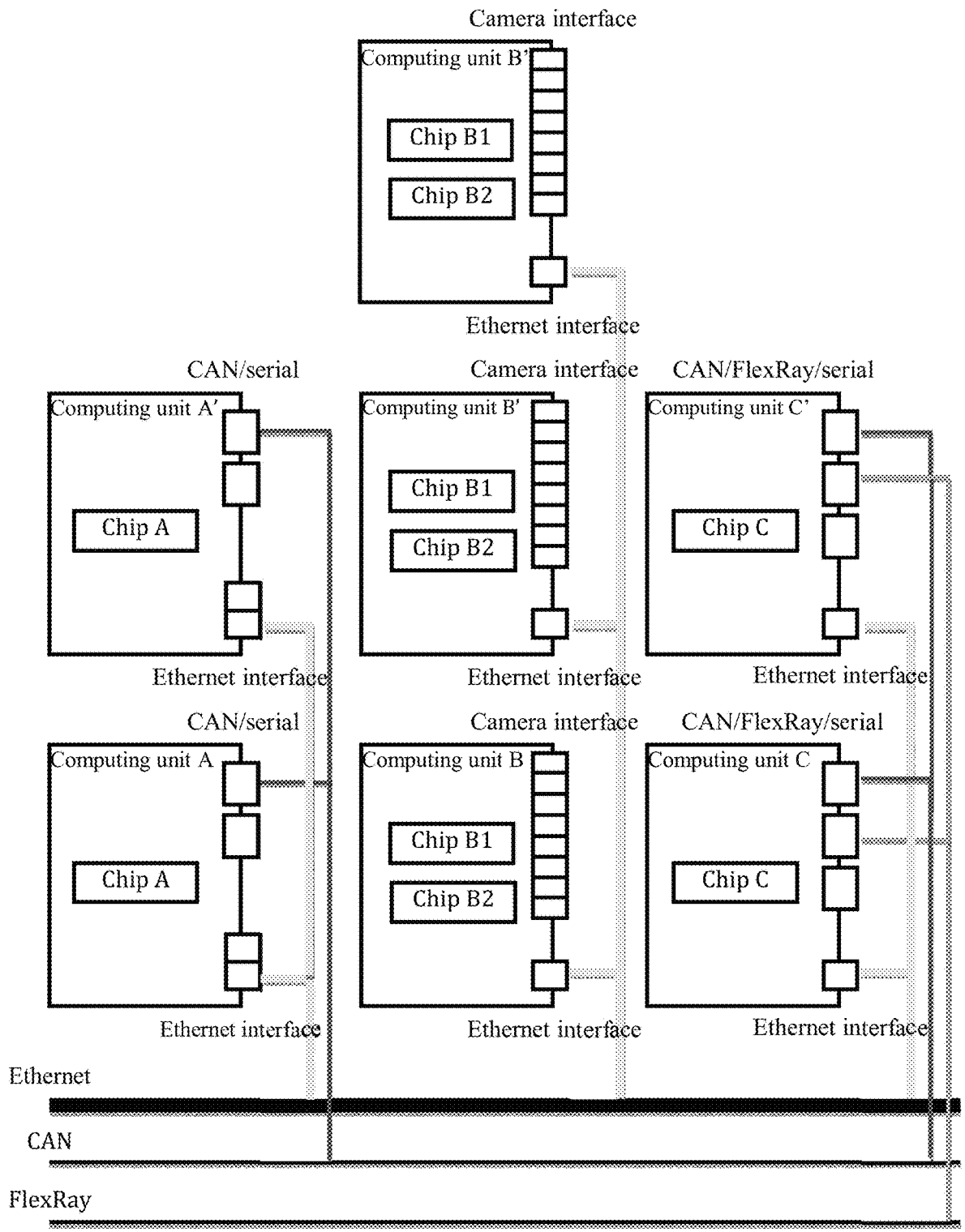
FIG. 6 is a diagram of the redundancy design of the computing units.
Figure 7:
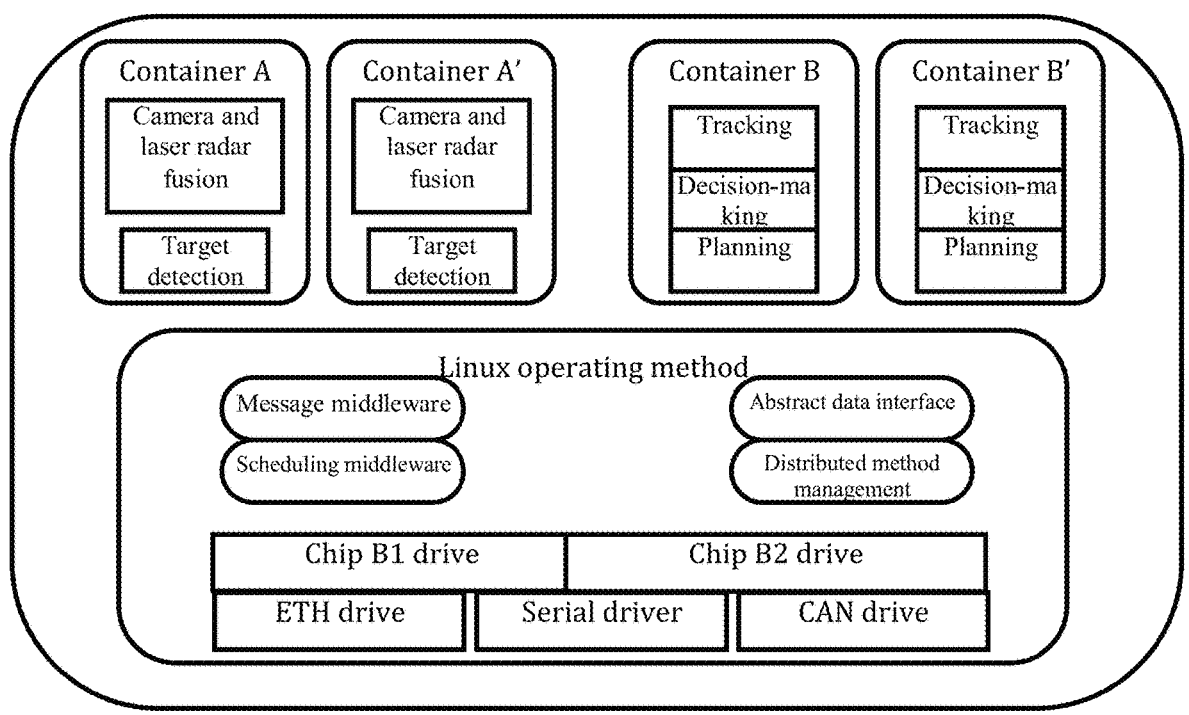
FIG. 7 is a diagram of the redundancy design of the functional modules.

The redundancy of the distributed centralized automatic driving method may be realized by physical redundancies of the computing units, as shown in FIG. 6; or, the redundancy of the distributed centralized automatic driving method may be realized by multiplexing of software method containers of the functional modules, as shown in FIG. 7.

During redundancy design, a distributed management method module generates an activation state signal to inform other units whether the present unit breaks down and whether the present unit is able to participate in method computing, and the main scheduling units are able to accurately determine whether each computing unit of the method can be used for allocating computing tasks by analyzing the activation state signal.

The working process of the distributed centralized automatic driving method is as follows:

1. Defining Functional Modules

The functional modules of the method are described in a standard XML (extensive markup language) format, and for each functional module interface, a desired performance indicator, a function to be fulfilled, a communication interface and a dependent data source are defined according to bus categories of the method. A static description of the functional modules determines the dependency of the functional modules on other parts of the method, and the functional modules, as scheduled units of a scheduling method, complete specified method functions based on interaction with other sub-methods. A definition of the functional modules includes a software function and a hardware function. Most functions of the functional modules are fulfilled by means of the collaboration of software and hardware.

2. Defining Data Domains

The data domains are used to describe the functional modules in the aspect of data input-output, and highlight the types and channels of data sources supporting specific functional modules, as well as data outputs of the functional modules, which are then provided for other functional modules in the method.

The functional modules exchange data flows within the capacity of the corresponding data domains. A physical carrier of the data domains is expressed as a physical bus interface such as a CAN bus, FlexRay or Ethernet.

3. Defining a Control and Message Flow

The control and message flow is defined in a client/server mode or a message release/subscription mode. The control and message flow in the client/server mode has an explicit sender and receiver, and communication requirements between the modules are met according to a preset state sequence; and it is unnecessary to specify a receiver or a sender for the control and message flow in the message release/subscription mode, and all modules subscribing messages of interest can receive messages or control commands released by a publisher 4. Calculating Unit Mapping The functional modules are mapped onto a selected specific method platform with reference to the definition of the data domains by evaluating computing capacity requirements and performance indicators. Each computing unit is a single SoC (method chip), or multiple SoCs located on a same hardware PCB (printed circuit board) or on multiple hardware PCB sets. The mapping is strategy-based or is based on experience of designers, and a mapping decision is made according to currently available overall method resources.

5. Implementing the Functional Modules

The functional modules are implemented according to the static definition of the modules and the definition of the data domains (input-output), and are divided into a hardware dependent layer, a hardware abstraction layer and an independent software layer, wherein the independent software layer is located above the hardware abstraction layer, fulfills software functions independent of a hardware form of specific (mapped) computing units, and completes the conversion from inputs to outputs in the data domains; the hardware dependent layer is used as a software platform to a great extent, and is developed according to different hardware forms; the hardware dependent layer of the functional modules is closely associated with the mapping of the computing units; and the independent software layer and the hardware abstraction layer are independent of the mapping of the computing units to a great extent.

A physical implementation form of the functional modules is expressed as one to multiple tasks, and these tasks independently or collaboratively run in one Container of the independent software layer.

6. Designing the Scheduling Method

The scheduling method completes the allocation of multiple computing tasks in the independent software layer of a current computing unit; and the task allocation and collaboration of the computing units are completed by the scheduling methods distributed in the computing units.

7. Redundancy Design

The multiple computing units in the distributed centralized automatic driving method form a computing cluster, and when any one unit in the cluster fails, the faulted unit will be automatically switched to or replaced with another computing unit which is in a good condition and has a computing capacity without human intervention by means of the redundancy design of the method.

The invention provides a distributed centralized idea and method for automatic driving methods, the technical solution may be specifically implemented by many methods and approaches, and the above embodiments are merely preferred ones provided by way of examples. Those skilled in the art may think of many alterations, modifications and substitutions without departing from the invention. It should be understood that various alternative solutions of the embodiments of the invention described in the specification may be adopted when the invention is implemented. The appended claims intent to define the scope of the invention, thus covering all methods and structures within the scope of these claims and their equivalents. All components that are not specified in the above embodiments may be realized by means of the prior art.

What is claimed is:

1. A method of implementing a distributed centralized automatic driving method in an automatic driving vehicle, wherein data domains and a control process are defined, a modular design is performed to implement each functional method, and each module is deployed to a computing unit of the corresponding data domain according to a load of a computing platform of the automatic driving vehicle, wherein the computing platform comprises a main processor, a plurality of computing units and a storage circuit unit, wherein the storage circuit unit stores a plurality programed functional modules, the method comprising:

Step 1: loading, by the main processor, the functional modules, and identifying the functional modules according to bus categories, wherein definition descriptions of the functional modules are described in an XML format, and for each said functional module, the definition description includes an interface, a desired performance indicator, a function to be fulfilled, a communication interface, a data source, and a safety and priority of the functional module, wherein the functional modules comprise:

a sensor processing module;

a perception positioning module, is configured to input point clouds, GPS longitudes and latitudes, an IMU, the speedometer and a high-precision map, and to output the global position of the automatic driving vehicle;

a perception target detection module, is configured to perform scene detection, target detection, road detection and traffic sign detection, is further configured to input the point clouds, camera videos and a global position of the automatic driving vehicle, and is further configured to output a target position, road rules and road guides;

a decision-making module, is configured to input the road guides, the global position of the automatic driving vehicle, a dynamic map and a static map, and to output running decisions, lane rules, and a position of a target in the dynamic map;

a planning module, comprises an available space, lane planning, traffic planning, path planning and path following, and is used for inputting the global position of the automatic driving vehicle, the running decisions, the lane rules, the position of the target in the dynamic map, and the road guides, and outputting a path to be followed by the automatic driving vehicle; and a vehicle control module, configured to input the path to be followed by the automatic driving vehicle and a sensor state for current control of the automatic driving vehicle, and to output a control command of a vehicle actuator, wherein the sensor processing module comprises: a laser radar processing module configured to output the point clouds, a visual processing module, an ultrasonic radar, an inertia unit, a GPS navigation module, and a speedometer;

Step 2: identifying, by the main processor, data domains to highlight types and channels of data sources supporting specified functional modules, as well as data outputs of the functional modules, which are then provided for other functional modules, wherein the functional modules exchange data flows within a capacity of the corresponding data domains, and a physical carrier of each said data domain is expressed as a physical bus interface;

Step 3: determining, by the main processor, whether a control and message flow between the functional modules is in a client/server mode or a message release/subscription mode;

Step 4: performing, by the main processor, unit mapping, comprising: mapping the functional modules to a selected specific computing unit with reference to definition of the data domains by evaluating computing capacity requirements and performance indicators of the computing units, and making a mapping decision according to currently available overall system resources of the computing platform;

Step 5: implementing, by the main processor, the functional modules by dividing the functional modules are divided into a hardware dependent layer, a hardware abstraction layer and an independent software layer according to a static definition of the functional modules and the definition of the data domains, wherein a physical implementation form of the functional modules is expressed as one to multiple computing tasks, and the computing tasks independently or collaboratively run in a container of the independent software layer;

Step 6: allocating, by the main processor, the computing tasks in the independent software layer to a plurality of the computing units, wherein the computing units execute corresponding allocated computing task, comprising:

executing, by the main processor, a plurality of main scheduling modules to master resource information of all the computing units, and allocate the computing tasks to the computing units according to resources of the computing units and computing task requirements by negotiating with scheduling middleware on each said computing unit, wherein the computing units are distributed in different chips and collaborate with each other by means of distributed computing and scheduling, and the computing task requirements comprise data requirements, performance requirements and resource requirements, wherein said computing task requirements are configured to facilitate completion of all sensor collaborations for applying the automatic driving method, a sensor capacity and computing capacity actually configured for the method, self-adaptable configuration in an environment of multiple computing platforms.

2. The method according to claim 1, wherein the resource information of the computing units is backed-up in all standby main scheduling units, so that any one of the main scheduling units is replaced with one of said main scheduling unit when breaking down; and further comprising:

Step 7: implementing a redundancy design, wherein the multiple computing units form a computing cluster, and when any one unit in the cluster fails, the faulted unit is automatically switched to or replaced with another computing unit which is in a good condition and has a computing capacity without human intervention.

3. The method according to claim 2, wherein the redundancy of the distributed method is realized by physical redundancies of the computing units or by multiplexing of software method containers of the functional modules; and dynamic capacity expansion of the distributed centralized method is realized by defining computing resources and computing tasks and adding corresponding software or hardware modules according to method requirements.

4. The method according to claim 3, wherein a redundancy computing unit generates an activation state signal to inform other units whether the present unit is faulted and whether the present unit is able to participate in method computing, and the main scheduling units are able to accurately determine whether each said computing unit of the method can be used for allocating the computing tasks by analyzing the activation state signal.

5. The method according to claim 1, wherein in step 1, the functional modules are implemented in a same hardware method, or are dynamically transferred to different hardware to run.

* * * * *